Jan. 29, 1935.  W. SCOTT  1,989,248
SHOWER FIXTURE
Filed Nov. 24, 1933
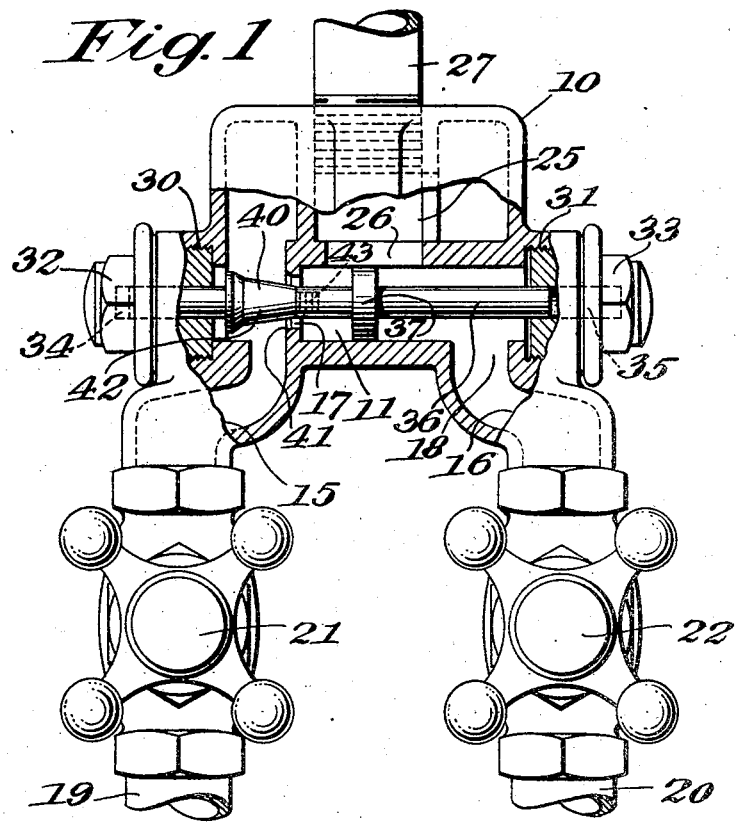
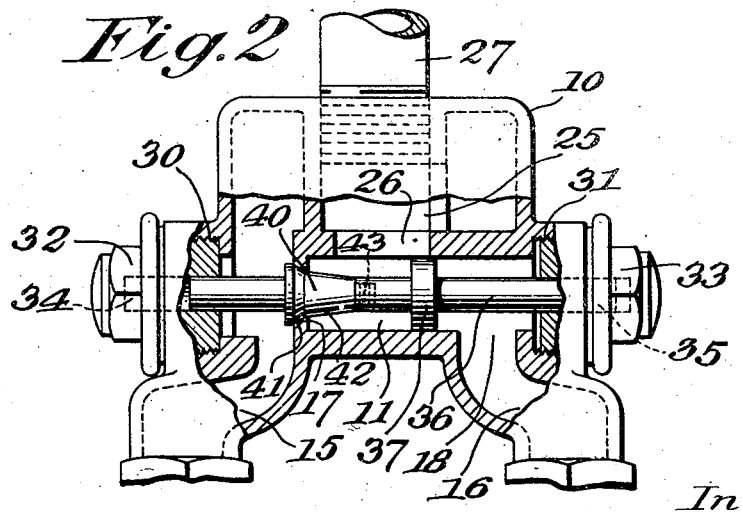
Inventor:
William Scott
By Macleod, Calver, Copeland & Dike
Attorneys.

Patented Jan. 29, 1935

1,989,248

UNITED STATES PATENT OFFICE 1,989,248

SHOWER FIXTURE

William Scott, Medford, Mass.

Application November 24, 1933, Serial No. 699,542

3 Claims. (Cl. 277—20)

This invention relates to devices commonly known as shower fixtures which are adapted to mix hot and cold water and supply the mixture to a spray nozzle.

Such devices, in general, comprise separate valve controlled hot and cold water conduits communicating with a single delivery conduit which terminates in a shower head. In using these devices the valves in the hot and cold water conduits are regulated until the water is delivered through the spray nozzle at the desired temperature. These devices operate satisfactorily only so long as the pressures of the water in the hot and cold water conduits remain the same respectively, as they were when the device was regulated. There are many factors which may cause variation of these pressures and, consequently, a reduction or increase in the temperature of the water delivered through the shower head resulting in discomfort to the user of the shower fixture. If, for example, the shower fixture is located upon one of the upper floors of a home or hotel and, while being used, water is drawn from the cold water conduit at one or more of the lower floors, the pressure in the cold water conduit at the point of delivery to the fixture is considerably reduced and sometimes ceases to flow. This often results in the delivery of water through the shower head of the fixture at such a high temperature as to scald the user of the fixture.

It is the object of the present invention to provide a device of this general character which is adapted to maintain the temperature of the water delivered through the shower head substantially constant and to close communication entirely between the fixture and one of the delivery conduits when the pressure of the water in the other delivery conduit becomes reduced a predetermined amount.

The invention will be more clearly understood from the following description in conjunction with the accompanying drawing in which.

Fig. 1 is an elevational view, partly in section, of a shower fixture embodying the invention, and Fig. 2 is a fragmentary view of a portion of the same.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

A shower fixture illustrating one embodiment of the invention is illustrated in the accompanying drawing and comprises a casing 10 providing a chamber 11 of cylindrical form. The casing 10 is also provided with a hot water passage 15 and a cold water passage 16 which communicate with the chamber 11 through inlet ports 17 and 18 respectively. Conduits 19 and 20 are suitably connected to the casing 10 so as to provide communication between the same and the hot water passage 15 and cold water passage 16 respectively. The flow of water delivered from the conduits 19 and 20 is controlled by valves 21 and 22 positioned respectively in the conduits 19 and 20. The casing 10 also is provided with a mixing chamber 25 which communicates with the chamber 11 through an exhaust port 26. A delivery conduit 27 is suitably connected with the casing 10 to provide communication at one end between the same and the mixing chamber 25 and is provided at its other end with the usual shower head (not shown).

Threaded openings 30 and 31 are provided in the casing directly opposite the hot water inlet port 17 and the cold water inlet port 18 respectively. The threaded openings 30 and 31 are closed by plugs 32 and 33 having bearings 34 and 35 respectively adapted to receive the opposite end portions of a valve stem 36 for slidable engagement therewith. An actuating valve member 37 is carried by the valve stem 36 and is located within the chamber 11 for movement therein and is adapted to receive upon one side the pressure of the cold water and upon its other side the pressure of the hot water introduced into the chamber from the hot water passage 15 and the cold water passage 16. In the embodiment illustrated, a valve 40 carried by the valve stem 36 is located in the hot water passage 15 and is adapted to engage a valve seat 41 formed in the casing 10 surrounding the hot water inlet port 17. As illustrated, the diameter of the valve 40 is less than that of the valve member 37. Preferably, the valve 40 is provided with a tapered portion 42 adapted to move into or out of the hot water inlet port 17 to increase or reduce the flow of water from the hot water passage 15 into the chamber 11 in response to variations in the pressure of water delivered to the chamber 11 from the passages 15 and 16. For convenience in assembly, the valve stem 36 is constructed of two parts which are connected together by the threaded connection 43.

In using the shower fixture described the valves 21 and 22 are regulated in the usual manner to secure delivery of water through the delivery pipe 27 at the desired temperature. When the valves 21 and 22 are opened the water flows through the hot water passage 15 and cold water passage 16 into the chamber 11 and thence through the exhaust port 26 to the delivery conduit 27. It will be noted that the pressure of hot water introduced into the chamber 11 acts upon one side of the actuating valve member 37 and the pressure of the cold water introduced into the chamber 11 acts upon the opposite side of the member 37. Consequently, if the pressure upon one side of the actuating member 37 is greater than that upon the other side, the actuating member 37 together with the valve 40 and its tapered portion 42 will be moved either to the right or the left, as viewed in Fig. 1, to cause the tapered portion 42 of the valve 40 to move into or out of the hot water inlet port 17 to increase or decrease the flow of hot water into the chamber 11. The actuating member 37 will cease movement when it reaches a position with respect to the exhaust port 26 such that the pressure upon opposite sides of the member 37 become equal. If, after the fixture has been regulated so as to obtain the delivery of water from the delivery conduit at the desired temperature, the pressure of the water in either the hot water conduit 19 or the cold water conduit 20 changes, the actuating member 37 will be again moved together with the tapered portion 42 until the pressures upon opposite sides of the member 37 again become balanced. In this manner the temperature of the water delivered through the delivery pipe 27 is maintained substantially constant.

If, however, the pressure of the water in the cold water conduit 20 becomes reduced to or below a predetermined amount, the valve member 37 will be moved to the right, as viewed in Fig. 1, to cause the tapered portion 42 of the valve 40 to restrict the flow of water through the inlet port 17 to such an extent that the pressure of the hot water in the inlet passage 15 will build up and cause the valve 40 to move into engagement with the valve seat 17, as shown in Fig. 2, and close communication between the hot water conduit and the delivery conduit thereby preventing delivery of hot water to the delivery conduit and the shower head which would scald the user of the shower fixture.

I claim:

1. In a device for mixing hot and cold water, a casing providing a chamber having hot and cold water inlet ports and a single exhaust port, and a valve member movably mounted in said chamber to receive on one side the pressure of cold water and on its other side the pressure of the hot water introduced into said chamber, said member providing a movable partition for controlling the sizes of the portions of the exhaust port through which the hot and cold water must flow.

2. In a device for mixing hot and cold water, a casing providing a chamber having hot and cold water inlet ports and a single exhaust port, a valve member movably mounted in said chamber to receive on one side the pressure of cold water and on its other side the pressure of the hot water introduced into said chamber, said member providing a movable partition for controlling the sizes of the portions of the exhaust port through which the hot and cold water must flow, and means operatively associated with said valve member adapted to reduce the passage for water through said hot water inlet port.

3. In a device for mixing hot and cold water, a casing providing a chamber having hot and cold water inlet ports and a single exhaust port, a valve member movably mounted in said chamber to receive on one side the pressure of cold water and on its other side the pressure of the hot water introduced into said chamber, said member providing a movable partition for controlling the sizes of the portions of the exhaust port through which the hot and cold water must flow, a tapered member movable in said hot water inlet port to reduce the passage for water therethrough, and operative connections between said valve member and tapered member.

WILLIAM SCOTT.